United States Patent [19]
Poole

[11] 3,760,182
[45] Sept. 18, 1973

[54] SEMI CONDUCTOR HEAT-FAULT DETECTOR
[76] Inventor: Clarence A. Poole, 3 N. 40th Ave., Yakima, Wash. 98902
[22] Filed: Feb. 29, 1972
[21] Appl. No.: 230,433

[52] U.S. Cl............250/492, 250/83.3 H, 324/158 T
[51] Int. Cl............................ H01j 35/00, G01t 1/16
[58] Field of Search ......................... 324/158 T, 73; 250/83.3 H, 84, 85

[56] References Cited
UNITED STATES PATENTS
| | | | |
|---|---|---|---|
| 3,056,106 | 9/1962 | Hendricks | 250/83.3 H |
| 2,920,485 | 1/1960 | Derganc | 250/83.3 H |
| 3,277,303 | 10/1966 | Jensen et al. | 250/83.3 H |
| 2,677,106 | 4/1954 | Haynes et al. | 250/83.3 H |
| 2,790,141 | 4/1957 | Geppert | 324/158 T |

OTHER PUBLICATIONS
"Infrared Exposes Hidden Circuit Flaws" by Vanzetti Electronics, April 3, 1967, pages 100–104

Use of Infrared in Aviation Week & Space Technology, May 4, 1964, pp. 82, 87–89

*Primary Examiner*—Harold A. Dixon
*Attorney*—John W. Kraft

[57] ABSTRACT

The semiconductor heat-fault detector of this invention comprises a barrel, an infrared generator, and lens means. The infrared generator is disposed at the terminal end of the body portion at its end opposite the lens portion with the infrared generator directed into the barrel. The infrared generator is powered from a suitable source, and has a preselected intensity. The lens means is disposed in the lens portion of the barrel, and is operable to condense and focus energy emitted from the generator.

4 Claims, 2 Drawing Figures

PATENTED SEP 18 1973 3,760,182

SEMI CONDUCTOR HEAT-FAULT DETECTOR

FIELD OF INVENTION:

The present invention relates to electrical component testers and, more particularly, to electrical component testers operable to selectively heat electronic components.

DESCRIPTION OF THE PRIOR ART:

In electrical component testing, a defective circuit may arise from faulty connections between electrical components or from a faulty component. In determining the later, it is known that the performance characteristic of a defective electrical component varies greatly with its heat in operation. Therefore, by selectively heating each component from a suitable outside source, the performance of the electrical component, in place, may be found.

Accordingly, it is an object of the present invention to provide heat-fault detector means to selectively heat an electrical component.

It is an other object of this invention to provide such heat-fault detecting means without making direct contact with an electrical component.

These and other objects shall become apparent from the description following, it being understood that modifications may be made without affecting the teachings of the invention here set out.

SUMMARY OF THE INVENTION

Generally, the semiconductor heat-fault detector of this invention comprises a barrel, an infrared generator, and lens means. The infrared generator is disposed at the terminal end of the body portion at its end opposite the lens portion with the infrared generator directed into the barrel. The infrared generator is powered from a suitable source, and has a preselected intensity. The lens means is disposed in the lens portion of the barrel, and is operable to condense and focus energy emitted from the generator.

A more thorough and comprehensive understanding may be had from the detailed description of the preferred embodiment when read in connection with the drawings forming a part of this specification.

DETAILED DESCRIPTION OF THE PREFERRED EMBODIMENT

Figure 1:
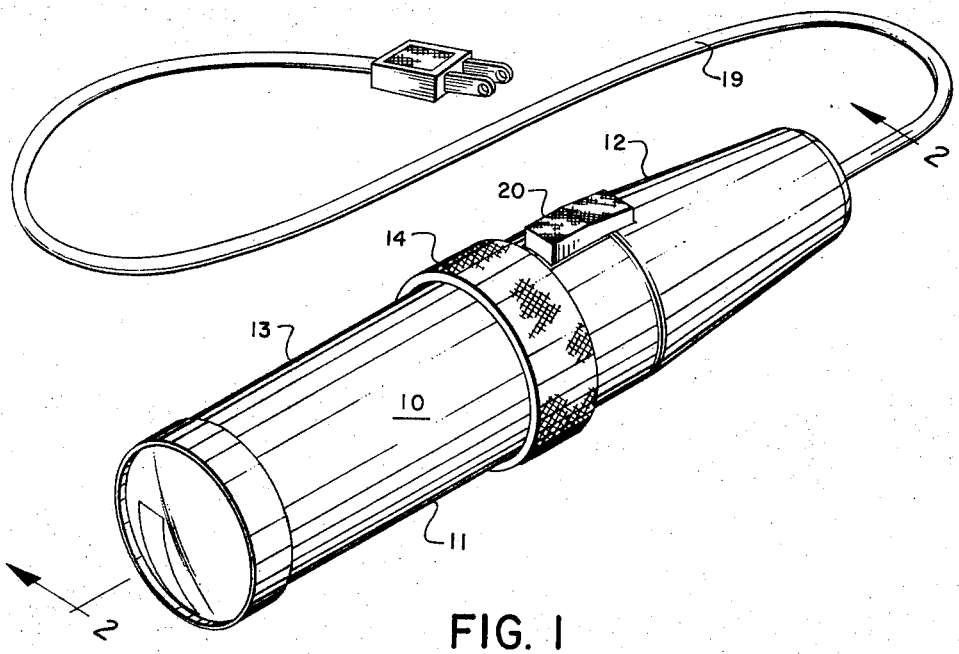
FIG. 1 is a right front perspective view of the semiconductor heat-fault detector of this invention.

Referring now to the drawings and, more particularly, to the FIG. 1, the semiconductor heat-fault detector of this invention is shown to advantage and generally identified by the numeral 10. The detector 10 includes a hollow barrel 11 which may be conveniently divided into a body portion 12 and a lens portion 13. The lens portion 13 is operable to threadably engage the body portion 12 by means of a sleeve 14. The sleeve 14 is fastened to one of the terminal ends of the lens portion 13. The body portion 12 is downwardly tapered distally from its forwardmost terminal end, at the center point of the barrel 11, to its opposite terminal end. The lens portion is a substantially cylindrical member operable to hold the lenses 15 and 16 in a predetermined relationship, shown to advantage in the FIG. 2. It is to be understood that the threads of the sleeve 14 and of the body portion 12 are operable as adjusting means, as hereinafter later described.

Figure 2:
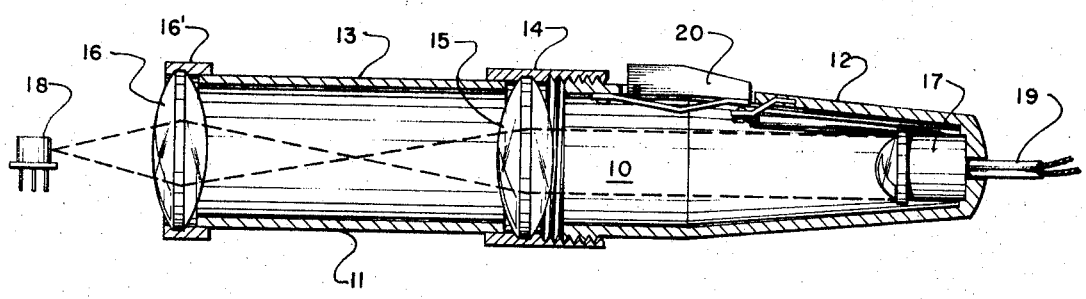
FIG. 2 is a cross-sectional view of the apparatus of the FIG. 1 taken substantially along the lines 2—2 of the FIG. 1 showing the interior configuration including the infrared generator, the lenses, and showing the focal path of light energy in broken lines for illustrative purposes, and including an electrical component shown for illustrative purposes.

Referring now to the FIG. 2, the end of the body portion 12 opposite the sleeve 14 is provided with a suitable infrared generator 17 which is directed into the barrel 11. The generator 17 is operable to emit energy to selectively heat an electrical component 18. The infrared generator 17 may be any of a variety of commonly known infrared generators. It is to be understood that the generator 17 is chosen for intensity and focal characteristics required to heat a preselected, size and type, electrical component 18. The infrared generator 17 is powered from a suitable source through an electrical wire 19. The infra-red generator 17 may be provided with means operable to selectively turn the generator 17 on and off. This control means may be a suitably configured switch, such as push-button switch 20. The switch 20 may be disposed in the body portion 12 of the barrel 11, and may be suitably configured to fit the hand of an operator gripping the body portion 12. It has been found to advantage to coat the interior surfaces of the barrel 11 with a reflective material to reduce adsorption of electromagnetic energy and to increase the efficiency of the detector 10 with respect to electricity used.

The lens portion 13 of the barrel 11 includes lenses 15 and 16, the lenses 15 and 16 being operable together to condense and focus the energy emitted from the generator 17 into a focused beam operable to selectively heat an electrical component 18. The primary lens 15 is operable to focus electromagnetic energy from the infrared generator 17. The primary lense 15 is mounted distally from the terminal end of the lens portion 13 having the sleeve 14, or distally from the centerpoint of the barrel 11. The objective lens 16 is operable to project the focal point of the energy beam distally from the forwardmost terminal end of the barrel 11. The objective lens 16 is mounted in a suitable mounting ring 16' which is disposed distally from the terminal end of the lens portion 13 opposite the sleeve 14. It is to be understood that the condensing and focusing of energy emitted by the generator 17 may be accomplished by a single lens. It is a characteristic of infrared generators that the emission characteristic changes with time in operation. To provide a substantially uniform emission level, the distance of the primary lens 15 from the infrared generator 17 may be selectively lengthened or shortened by threadably engaging or disengaging the body portion 12 from the lens portion 13 at the sleeve 14.

In operation, the generator 17 may be activated by connecting it through the wire 19 to a suitable power source, or, in the further embodiment, by actuating the switch 20. The detector 10 may then be directed at a electrical component 18 in a test to determine its reliability. This may be done to successive electrical components until it is shown which of the electrical components 18 is defective.

Having thus described in detail a preferred apparatus which embodies the concepts and principles of the in- vention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

I claim:

1. A method for testing semiconductors and semiconductor electronic components, comprising the steps of: generating a focused beam of infrared energy; and directing said beam onto said semiconductor.

2. The method of claim 1 including the step of adjusting said beam to selectively control the focus of said beam.

3. The method of claim 1 wherein said beam is generated by a generator having intensity and focusing characteristics required for a preselected size and type of semiconductor.

4. The method of claim 1 including the step of directing said beam onto successive semiconductors to identify a defective semiconductor.

* * * * *